United States Patent
Wang et al.

(10) Patent No.: US 8,761,094 B2
(45) Date of Patent: Jun. 24, 2014

(54) METHOD AND APPARATUS THAT FACILITATES INTERFERENCE CANCELLATION FOR CONTROL CHANNELS IN HETEROGENOUS NETWORKS

(75) Inventors: Renqiu Wang, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 621 days.

(21) Appl. No.: 12/838,294

(22) Filed: Jul. 16, 2010

(65) Prior Publication Data

US 2011/0038328 A1 Feb. 17, 2011

Related U.S. Application Data

(60) Provisional application No. 61/227,692, filed on Jul. 22, 2009.

(51) Int. Cl.
- *H04W 4/00* (2009.01)
- *H04W 72/00* (2009.01)
- *H04W 28/04* (2009.01)
- *H04W 72/12* (2009.01)
- *H04W 72/04* (2009.01)
- *H04W 84/04* (2009.01)

(52) U.S. Cl.
CPC ........ *H04W 28/048* (2013.01); *H04W 72/1278* (2013.01); *H04W 72/0413* (2013.01); *H04W 84/045* (2013.01)
USPC ............ 370/329; 370/338; 455/444; 455/450

(58) Field of Classification Search
None
See application file for complete search history.

(56) References Cited

U.S. PATENT DOCUMENTS

| | | | |
|---|---|---|---|
| 2008/0287155 | A1 | 11/2008 | Xu et al. |
| 2009/0017762 | A1 | 1/2009 | Jovicic et al. |
| 2010/0085913 | A1 | 4/2010 | Subrahmanya |

(Continued)

FOREIGN PATENT DOCUMENTS

EP 1079651 A1 2/2001

OTHER PUBLICATIONS

"3GPP TR 25.820 V8.2.0; 3rd Generation Partnership Project; Technical Specification Group Raclio Access Networks 3G Home NodeB Study Item Technical Report (Release 8)", 3GPP TR 25.820 V8.2. 0, vol. 25.820, No. v8.2.0, Sep. 1, 2008 XP002525355, paragraphs [ 5 . 2 . 3 ], [4.2.4], [5.3.4], [5.3.6].
International Search Report and Written Opinion—PCT/US2010/042806—International Search Authority, European Patent Office, Jan. 28, 2011.

(Continued)

*Primary Examiner* — Marcus R Smith
(74) *Attorney, Agent, or Firm* — Nerrie M. Zohn

(57) ABSTRACT

Aspects are described for reducing interference in wireless systems. In a first embodiment, an uplink acknowledgment region associated with a macro cell is determined, and an assignment of uplink control resources is restricted to a region within the uplink acknowledgment region. A control signal is then transmitted to user equipment via the assignment of uplink control resources. In another embodiment, control signals are received from wireless terminals, which include desired uplink control signals associated with an access point base station, as well as interfering uplink acknowledgement signals associated with macro cells. The control signals may then be regenerated by cancelling the set of interfering signals from the control signals. The desired uplink control signals are then decoded.

28 Claims, 12 Drawing Sheets

(56) References Cited

U.S. PATENT DOCUMENTS

| | | | |
|---|---|---|---|
| 2010/0177722 A1* | 7/2010 | Guvenc | 370/329 |
| 2010/0190447 A1 | 7/2010 | Agrawal et al. | |
| 2010/0226356 A1 | 9/2010 | Sahin et al. | |
| 2010/0311412 A1 | 12/2010 | Whinnett | |
| 2010/0329206 A1* | 12/2010 | Thome et al. | 370/331 |
| 2010/0331030 A1* | 12/2010 | Nory et al. | 455/509 |
| 2011/0109758 A1 | 5/2011 | Liang et al. | |
| 2011/0110420 A1 | 5/2011 | Liang et al. | |
| 2011/0292997 A1 | 12/2011 | An et al. | |
| 2013/0136079 A1 | 5/2013 | Wang et al. | |

OTHER PUBLICATIONS

Motorola: "Macro-cell uplink interference to HeNBs", 3GPP Draft; R4-092400, 3rd Generation Partnership Project (3GPP), Mobile Competence Centre ; 650, Route Des Lucioles ; F-06921 Sophia-Antipolis Cedex ; France, no. Los Angeles, CA; 20090625, Jun. 25, 2009, XP050353634, [retrieved on Jun. 25, 2009] the whole document.

Taiwan Search Report—TW099124216—TIPO—May 27, 2013.

* cited by examiner

METHOD AND APPARATUS THAT FACILITATES INTERFERENCE CANCELLATION FOR CONTROL CHANNELS IN HETEROGENOUS NETWORKS

CROSS-REFERENCE TO RELATED APPLICATIONS

This application claims the benefit of U.S. Provisional Patent Application Ser. No. 61/227,692 entitled "INTERFERENCE CANCELLATION TECHNIQUES FOR CONTROL CHANNELS IN HETEROGENEOUS NETWORKS," which was filed Jul. 22, 2009. The aforementioned application is herein incorporated by reference in its entirety.

BACKGROUND

I. Field

The following description relates generally to wireless communications, and, more particularly, to interference cancellation techniques for control channels in heterogeneous networks.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

With respect to the design of heterogeneous networks with Macro/Pico/Femto cells, it is noted that much interest has emerged both from a standardization and implementation perspective. A particular challenge for heterogeneous system design is how to deal with interference experienced at pico/femto cells from macro cells, as well as from other pico/femto cells. Accordingly, it would be desirable to implement methods and apparatuses that reduce such interference in a manner that is not addressed by conventional systems.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present concepts of one or more embodiments in a simplified form as a prelude to the more detailed description that is presented later.

In accordance with one or more embodiments and corresponding disclosure thereof, various aspects are described in connection with reducing interference in wireless communication systems. In one aspect, methods and computer program products are disclosed that facilitate multiplexing control signals in heterogeneous networks. Such embodiments include determining an uplink acknowledgment region associated with a macro cell, and assigning uplink control resources to a region within the uplink acknowledgment region. These embodiments further include transmitting a control signal to at least one user equipment, wherein the control signal is transmitted via the assigned uplink control resources.

Another aspect relates to an apparatus configured to multiplex control signals in heterogeneous networks. The apparatus includes a processor configured to execute computer executable components stored in memory. The computer executable components include a macro uplink component, an assignment component, and a transmitting component. The macro uplink component is configured to determine an uplink acknowledgment region associated with a macro cell, where the assignment component is configured to assign uplink control resources to a region within the uplink acknowledgment region. The transmitting component is configured to transmit a control signal to at least one user equipment, wherein the control signal is transmitted via the assignment of uplink control resources.

Additional aspects relate to an apparatus that includes means for determining, means for restricting, and means for transmitting. The means for determining determines an uplink acknowledgment region associated with a macro cell, whereas the means for assigning assigns uplink control resources to a region within the uplink acknowledgment region. The means for transmitting transmits a control signal to at least one user equipment, wherein the control signal is transmitted via the assignment of uplink control resources.

In another aspect, other methods and computer program products are disclosed that facilitate interference cancellation in heterogeneous networks. Such embodiments include receiving a set of control signals from a plurality of wireless terminals. For these embodiments, the set of control signals include desired uplink control signals associated with an access point base station, as well as interfering uplink acknowledgement signals associated with at least one macro cell. These embodiments further include identifying whether the set of interfering uplink acknowledgment signals interferes with the set of control signals, wherein none of the set of interfering uplink acknowledgment signals is associated with a discontinuous transmission (DTX). The set of control signals may then be regenerated, which can include cancelling the set of interfering uplink acknowledgment signals from the set of control signals. Furthermore, these embodiments include decoding the desired uplink control signals.

Yet another aspect relates to an apparatus that facilitates interference cancellation in heterogeneous networks. The apparatus includes a processor configured to execute computer executable components stored in memory. The computer executable components include a receiving component, a macro uplink component, a regeneration component, and a decoding component. The receiving component is configured to receive a set of control signals from a plurality of wireless terminals. For this embodiment, the set of control signals include desired uplink control signals associated with an access point base station, as well as interfering uplink acknowledgement signals associated with at least one macro cell. The macro uplink component is configured to identify whether the interfering uplink acknowledgment signals interferes with the set of control signals, wherein none of the interfering uplink acknowledgment signals are associated with a discontinuous transmission (DTX). The regeneration component is then configured to regenerate the set of control signals, which may include cancelling the interfering uplink acknowledgment signals from the set of control signals. The decoding component is configured to decode the desired uplink control signals.

Additional aspects relate to an apparatus that includes means for receiving, means for identifying, means for regenerating, and means for decoding. The means for receiving receives a set of control signals from a plurality of wireless terminals. For this embodiment, the set of control signals include desired uplink control signals associated with an access point base station, as well as interfering uplink acknowledgement signals associated with at least one macro cell. The means for identifying identifies whether the set of interfering uplink acknowledgment signals interferes with the set of control signals, wherein none of the interfering uplink acknowledgment signals are associated with a discontinuous transmission (DTX). The means for regenerating then regenerates the set of control signals, which may include cancelling the interfering uplink acknowledgment signals from the set of control signals. The means for decoding then decodes the desired uplink control signals.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
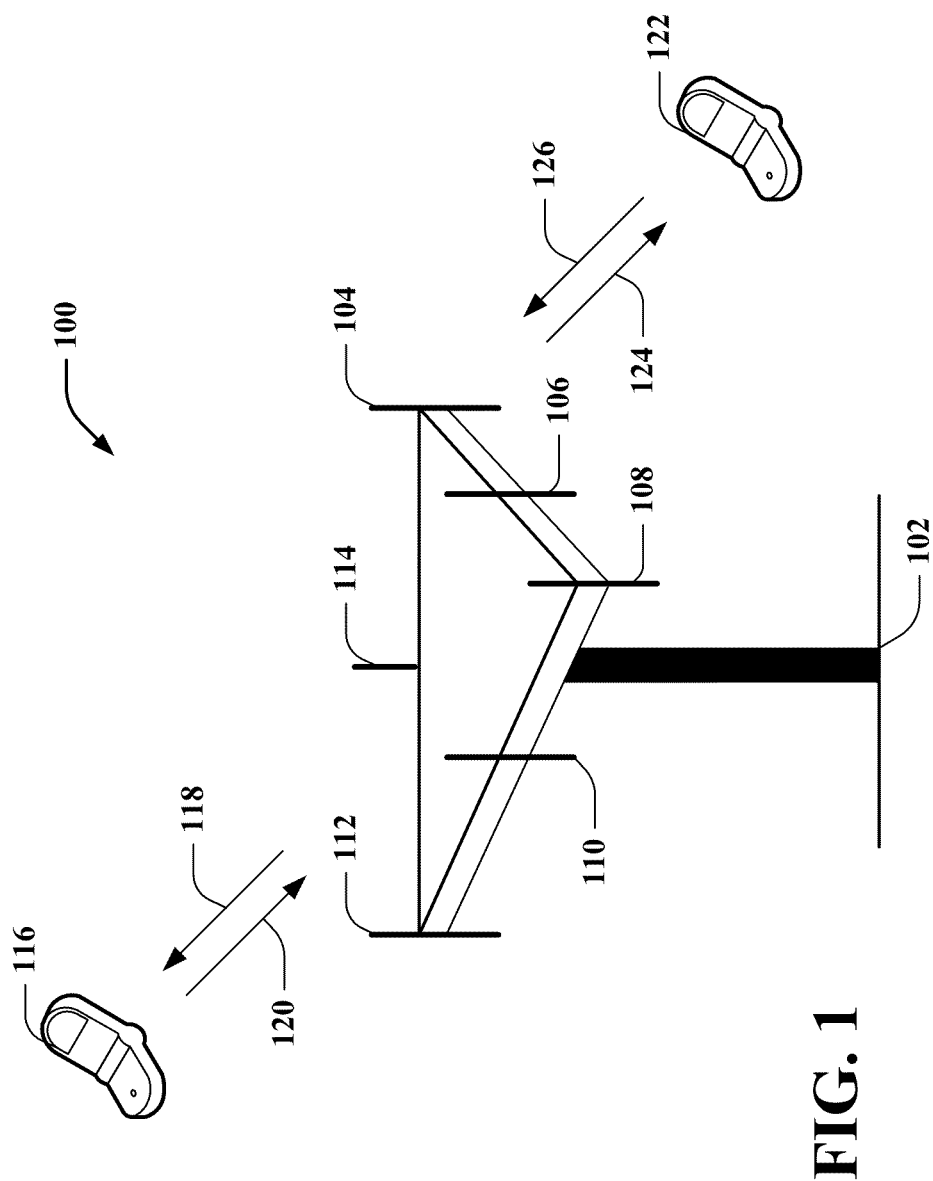
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Techniques for reducing interference in wireless systems are described herein. Among other things, transmitting signals in the presence of interference from intermodulation and/or harmonic products of received signals is discussed. In a particular embodiment, interference caused by the intermodulation and/or harmonic products are estimated, wherein the estimated interference is then used to zero out a set of log-likelihood ratio (LLR) metrics. In another embodiment, aspects are disclosed which avoid transmitting signals via sub-carriers that overlap with interfering intermodulation and/or harmonic products of received signals.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing, and mobile office applications Fast data transmission protocols such as hybrid automatic repeat request, (HARQ) can be used on the uplink and downlink. Such protocols allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), access point base station, or some other terminology.

Referring now to the drawings, FIG. 1 illustrates a wireless communication system in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. While, two antennas are illustrated for each antenna group, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Using beamforming to transmit to access terminals scattered randomly through an associated coverage can also reduce interference to access terminals in neighboring cells.

Figure 2:
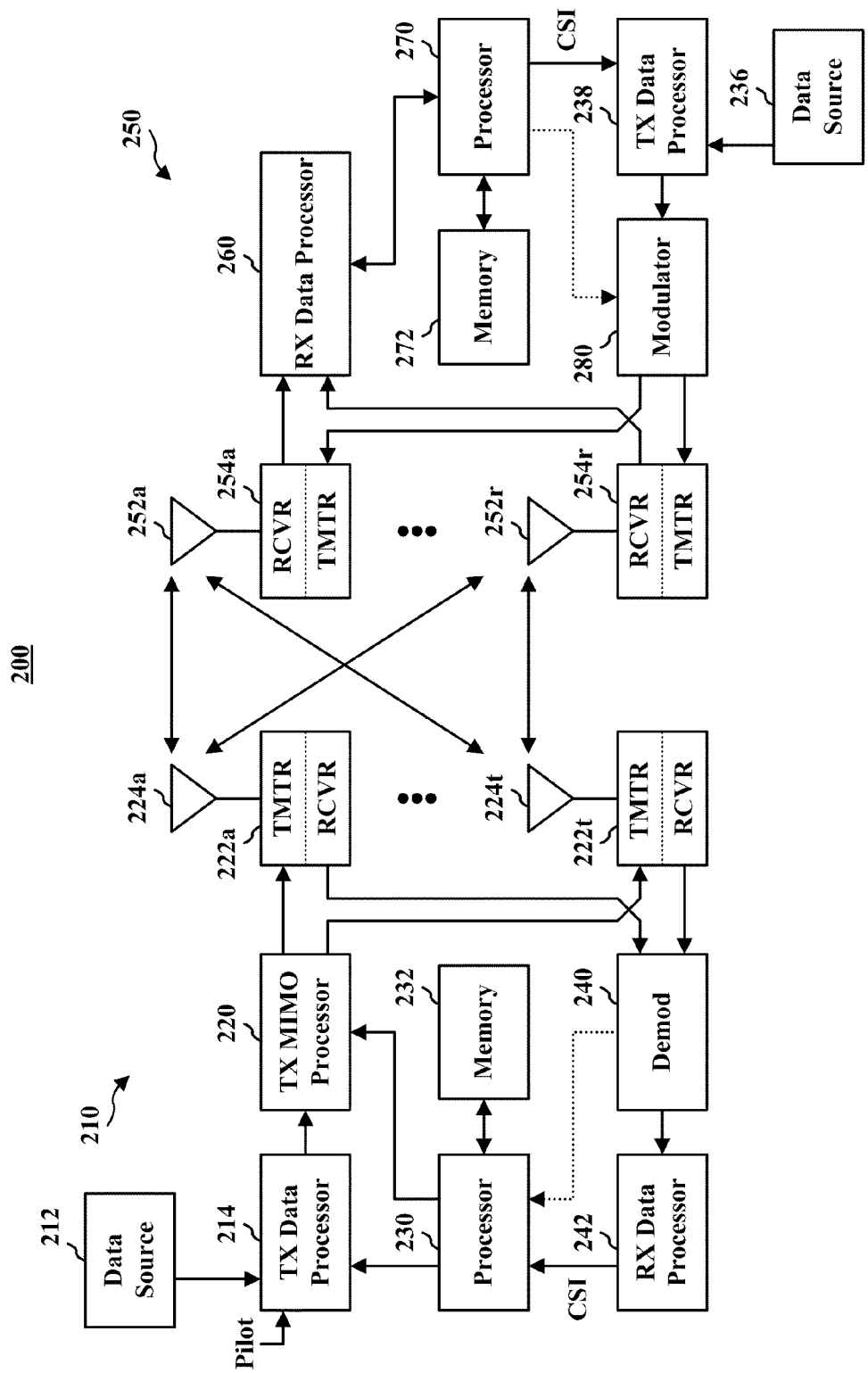
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from the exemplary base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link (e.g., channel state information (CSI)) and/or the received data stream. The reverse link message can be processed by a TX data processor 238, which also receives traffic data for a number of data streams from a data source 236, modulated by a modulator 280, conditioned by transmitters 254a through 254r, and transmitted to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
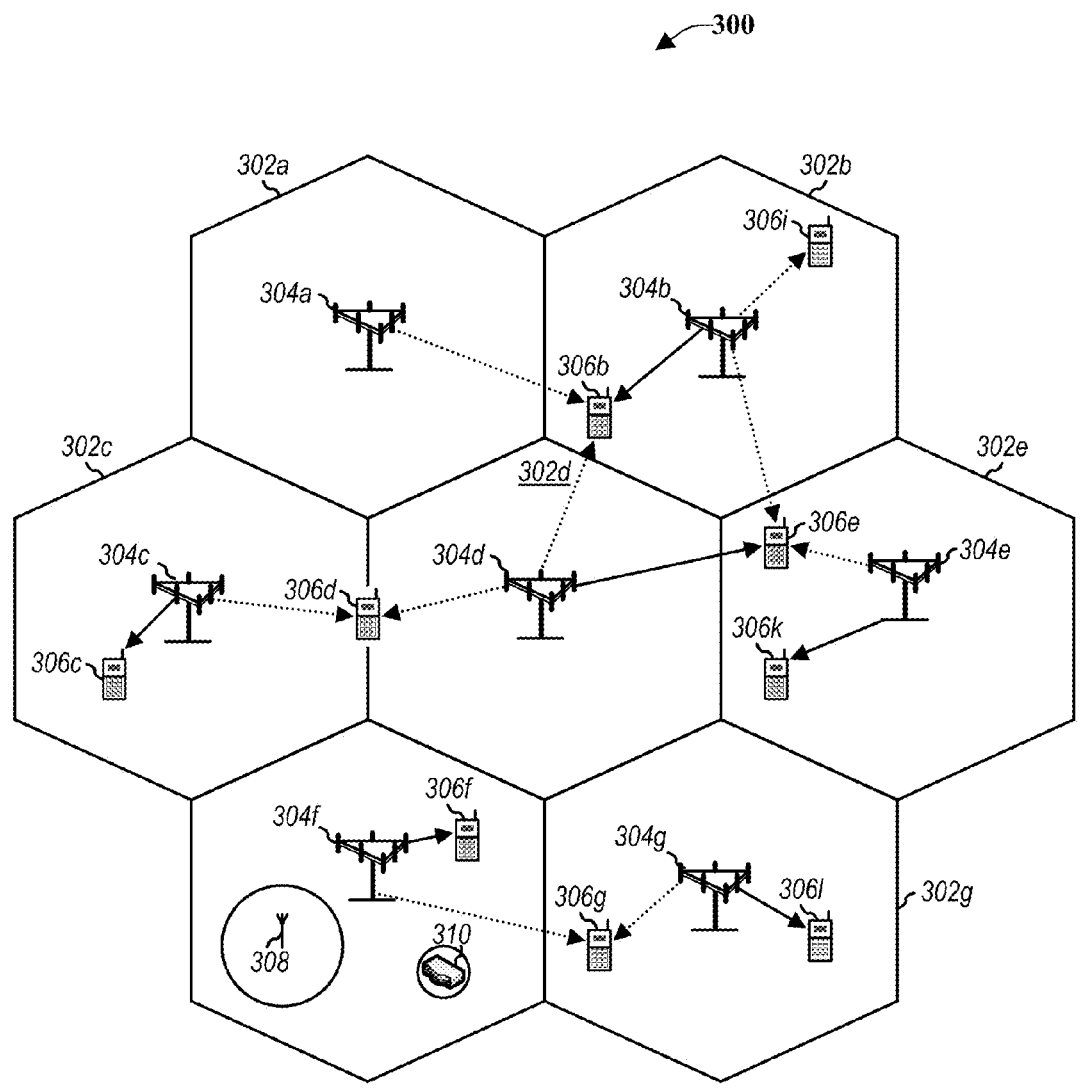
FIG. 3 illustrates an exemplary multi-cell environment that facilitates various aspects disclosed herein.

FIG. 3 illustrates an exemplary wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. to serve one or more frequencies). Various access terminals (ATs) 306, including ATs 306a-306k, also known interchangeably as user equipment (UE) or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, macro cells 302a-302g may cover a few blocks in a neighborhood.

The APs 304 are also referred to as Macro evolved Node-Bs (eNBs). Currently, there is a large amount of emphasis being placed on heterogeneous networks that can additionally include but are not limited one or more picocells 308 and/or femtocells 310. For example, picocell 308 can be a wireless access point typically covering a small area, such as in an indoor environment (e.g., offices, shopping malls, train stations, aircraft, etc.), wherein picocell 308 is analogous to a Wi-Fi access point. Femtocell 310 can be a small cellular base station, typically designed for use in residential or small business environments. Here, it is noted that femtocell 310 can connect to a service provider's network via broadband internet access (such as DSL or cable), and current designs typically support two to four active mobile phones in a residential setting. Femtocell 310 allows service providers to extend service coverage indoors, especially where access would otherwise be limited or unavailable.

A significant challenge for heterogeneous system design is how to mitigate strong interference from the macro eNBs 304 to the picocells 308 and/or femtocells 310, in addition to the interference between the picocells 308 and/or femtocells 310. Discussed below are techniques for adaptive picocell 308 and/or femtocell 310 uplink control channel design, which allow the macro eNBs 304, and the picocells 308/femtocells 310 to be multiplexed via the same resource. An advanced interference cancellation receiver is also adopted at the macro eNBs 304 to suppress interference and improve performance.

Figure 4:
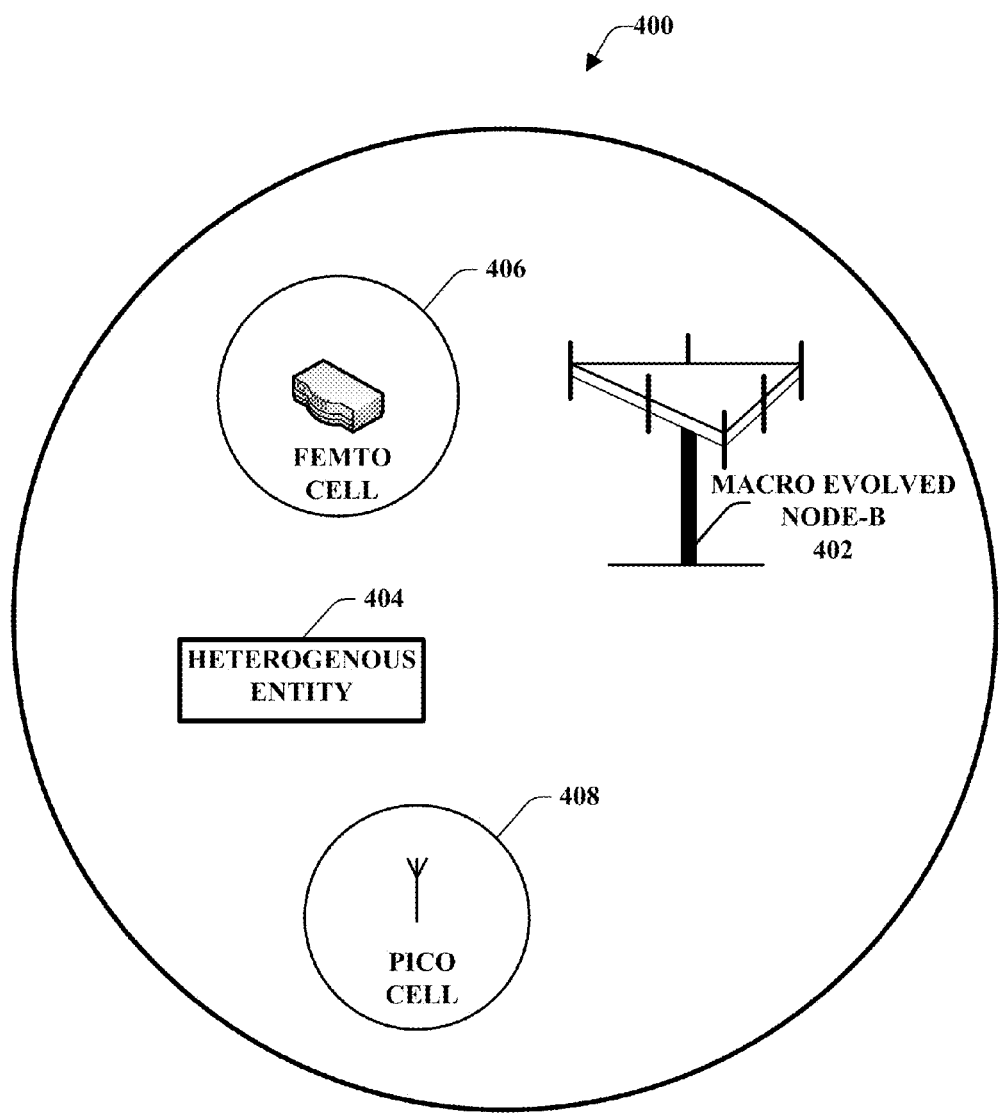
FIG. 4 illustrates an exemplary system in which an access point base station experiences interference from various network entities.

Referring now to FIG. 4, a general component block diagram illustrating an exemplary wireless communication system is shown in accordance with an aspect of the subject innovation. The system 400 includes a macro evolved Node-B (eNB) 402, heterogeneous entity 404, femto cell 406, and pico cell 408. Here, it should be noted that heterogeneous entity 404 may reside within an access point base station, wherein such access point base station may be associated with a femto cell (e.g., femto cell 406) and/or a pico cell (e.g., pico cell 408). As mentioned supra, the current innovation relates to techniques for adaptive pico cell and/or femto cell uplink control channel design, which allow macro eNB 402, femto cell 406, and pico cell 408 to be multiplexed via the same resource.

It is noted that, if heterogeneous entity 404 directly follows the current specification for macro eNB 402, the uplink control (e.g., acknowledgment (ACK) and channel quality indicator (CQI)) may collide with macro eNB's 402 uplink ACK message, CQI, or primary uplink shared channel (PUSCH) resources. Applying interference cancellation for the macro eNB's 402 CQI may be accomplished by either cancelling modulation symbols, or by cancelling reconstructed signals. The first option requires prior knowledge of the user's resource allocation, whereas the second option requires additional payload information. Applying interference cancellation for the macro eNB's 402 PUSCH also requires prior knowledge of the user assignment, modulating and coding schemes (MCS), tables, and so forth. Furthermore, in order to get this dynamic assignment information, heterogeneous entity 404 would need to constantly monitor macro eNB's 402 assignments, which is not an efficient use of system 400 resources.

In an aspect, heterogeneous entity 404 obtains the macro eNB's 402 cell identification (ID), which does not typically utilize an excessive amount of network 400 resources. If heterogeneous entity 404 can obtain the macro eNB's 402 cell ID, then heterogeneous entity 404 can ascertain macro eNB's 402 uplink ACK region. It can be appreciated that this information is semitact such that heterogeneous entity 404 does not need to know specific user assignments. With this information, heterogeneous entity 404 can provide interference cancellation (IC) friendly adaptive control channel assignments, wherein it always assigns uplink ACK and CQI resources in macro eNB's 402 ACK region.

Employing adaptive assignments enables heterogeneous entity 404 to avoid macro eNB's 402 CQI and PUSCH region, wherein such assignments only collide with macro eNB's 402 ACK region. Since the number of users in pico cells and femto cells is usually much less than that a macro cell, macro eNB's 402 ACK region will typically be robust enough to accommodate heterogeneous entity's 404 uplink control channels. In an aspect, heterogeneous entity 404 can acquire macro eNB's 402 base sequence for ACK multiplexing via macro eNB's 402 cell ID.

It is noted that the adaptive approach is IC friendly because macro eNB's 402 ACK interference can be readily cancelled out. For instance, heterogeneous entity 404 can decode the ACK information with tri-state detection assuming the maximum number of users (e.g., eighteen for normal cyclic prefix (CP), and eight for extended CP). Moreover, heterogeneous entity 404 can perform discontinuous transmission (DTX) assisted ACK channel interference cancellation. For this embodiment, tri-state decoding is used at the receiver for ACK channel with DTX assisted interference cancellation to suppress macro eNB's 402 interference. For one resource/user, if DTX is detected, then the resource is not occupied, and no cancellation is necessary for this user. If DTX is not detected, however, then the resource is occupied, wherein it can be beneficial to re-construct user signals and cancel them from the received signals.

Figure 5:
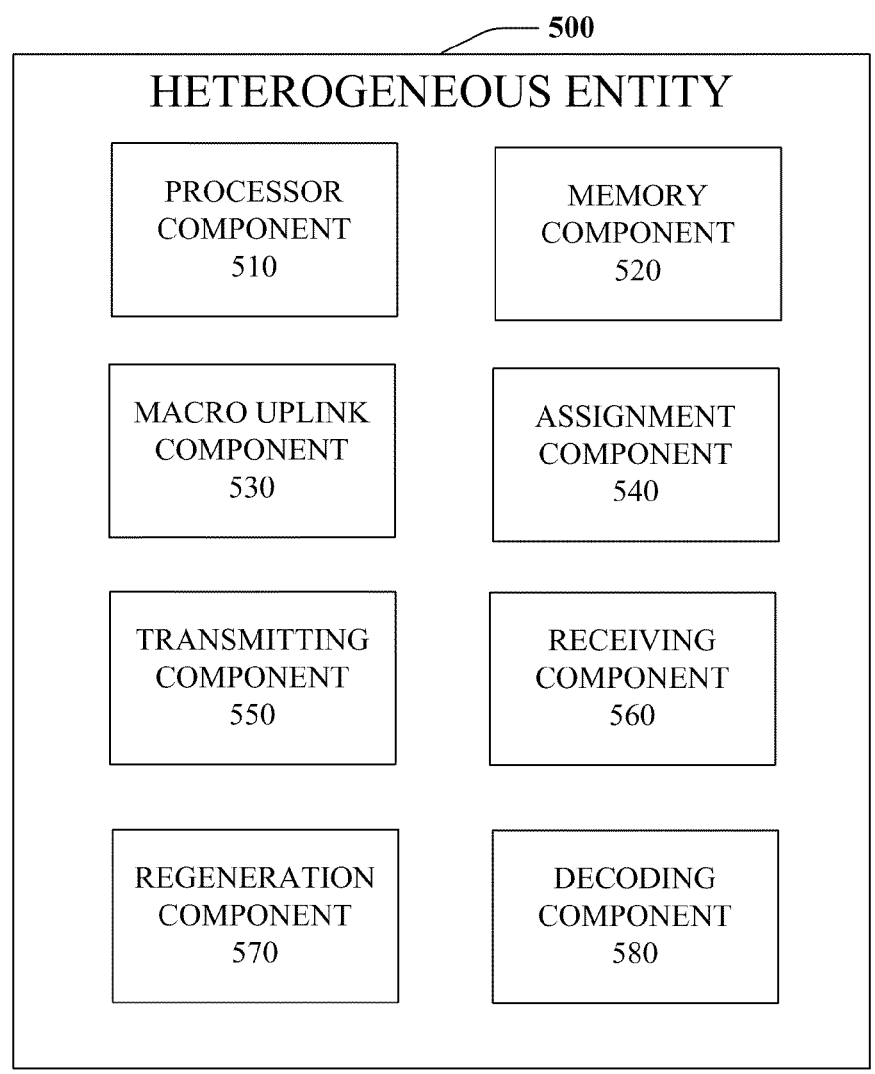
FIG. 5 illustrates a block diagram of an exemplary access point base station that facilitates interference cancellation in accordance with an aspect of the subject specification.

Referring next to FIG. 5, an exemplary heterogeneous entity that facilitates interference reduction according to an embodiment is illustrated. As shown, heterogeneous entity 500 may include processor component 510, memory component 520, macro uplink component 530, assignment component 540, transmitting component 550, receiving component 560, regeneration component 570, and decoding component 580. Here, it should be appreciated that heterogeneous entity 500 may be associated with either a femto cell or pico cell.

In one aspect, processor component 510 is configured to execute computer-readable instructions related to performing any of a plurality of functions. Processor component 510 can be a single processor or a plurality of processors which analyze information to be communicated from heterogeneous entity 500 and/or generate information that is utilized by memory component 520, macro uplink component 530, assignment component 540, transmitting component 550, receiving component 560, regeneration component 570, and/or decoding component 580. Additionally or alternatively, processor component 510 may be configured to control one or more components of heterogeneous entity 500.

In another aspect, memory component 520 is coupled to processor component 510 and configured to store computer-readable instructions executed by processor component 510. Memory component 520 may also be configured to store any of a plurality of other types of data including generated by any of macro uplink component 530, assignment component 540, transmitting component 550, receiving component 560, regeneration component 570, and/or decoding component 580. Memory component 520 can be configured in a number of different configurations, including as random access memory, battery-backed memory, hard disk, magnetic tape, etc. Various features can also be implemented upon memory component 520, such as compression and automatic back up (e.g., use of a Redundant Array of Independent Drives configuration).

In a first exemplary embodiment, heterogeneous entity 500 is configured to facilitate multiplexing control signals by strategically restricting an assignment of uplink control resources to a particular region. Within such embodiment, macro uplink component 530 may be configured to determine an uplink acknowledgment region associated with a macro cell, whereas assignment component 540 may be configured to restrict an assignment of uplink control resources to a region within the uplink acknowledgment region. Here, it should be noted that the assignment of uplink control resources may include various types of resources associated an access point base station. For instance, the assignment of uplink control resources may include a set of Channel Quality Indicator resources associated with the access point base station, and/or a set of acknowledgment resources associated with the access point base station.

For this embodiment, it should be further noted that the assignment restriction of the uplink control resources can be performed in any of a plurality of ways. For example, macro uplink component 530 may be configured to extrapolate a base sequence from an identifier associated with the macro cell, wherein assignment component 540 is then configured to restrict the assignment of uplink control resources according to the base sequence. Macro uplink component 530 may also be configured to ascertain a second uplink acknowledgment region associated with an access point base station, wherein assignment component 540 is configured to further restrict the assignment of uplink control resources according to the second uplink acknowledgment region.

As illustrated, heterogeneous entity 500 may also include transmitting component 550. Within such embodiment, transmitting component 550 may be configured to transmit a control signal to user equipment via the assignment of uplink control resources ascertained by assignment component 540. In a particular aspect, transmitting component 550 resides within an access point base station, wherein the access point base station is associated with either a femto cell or a pico cell.

A further embodiment for facilitating interference cancellation is also disclosed, wherein a DTX-assisted algorithm is implemented. For this particular embodiment, it is contemplated that at least a portion of heterogeneous entity 500 resides within an access point base station, wherein the access point base station is again associated with either a femto cell or a pico cell. To facilitate this embodiment, receiving component 560 is configured to receive a set of control signals from a plurality of wireless terminals. Here, the set of control signals include desired uplink control signals associated with an access point base station, as well as interfering uplink acknowledgement signals associated with at least one macro cell.

When implementing the DTX-assisted algorithm, macro uplink component 530 may be configured to identify a subset of interfering uplink acknowledgment signals that are not associated with a DTX, whereas regeneration component 570 may be configured to regenerate the received control signals. Moreover, regeneration component 570 may be configured to regenerate the received control signals, wherein the subset of interfering uplink acknowledgment signals is cancelled from the control signals. Decoding component 580 is then configured to decode the desired uplink control signals based on the cancellation of the subset of interfering uplink acknowledgment signals from the received control signals.

For this embodiment, it should be further noted that the DTX-assisted algorithm can be implemented in any of a plurality of ways. For example, macro uplink component 530 may be configured to determine that a particular acknowledgment signal is not associated with a DTX, wherein regeneration component 570 is then configured to cancel the particular acknowledgment signal. In another aspect, macro uplink component 530 may be configured to determine a number of signals included in the subset of interfering uplink acknowledgment signals, wherein regeneration component 570 is then configured to cancel the subset of interfering uplink acknowledgment signals based on the number of signals.

Figure 6:
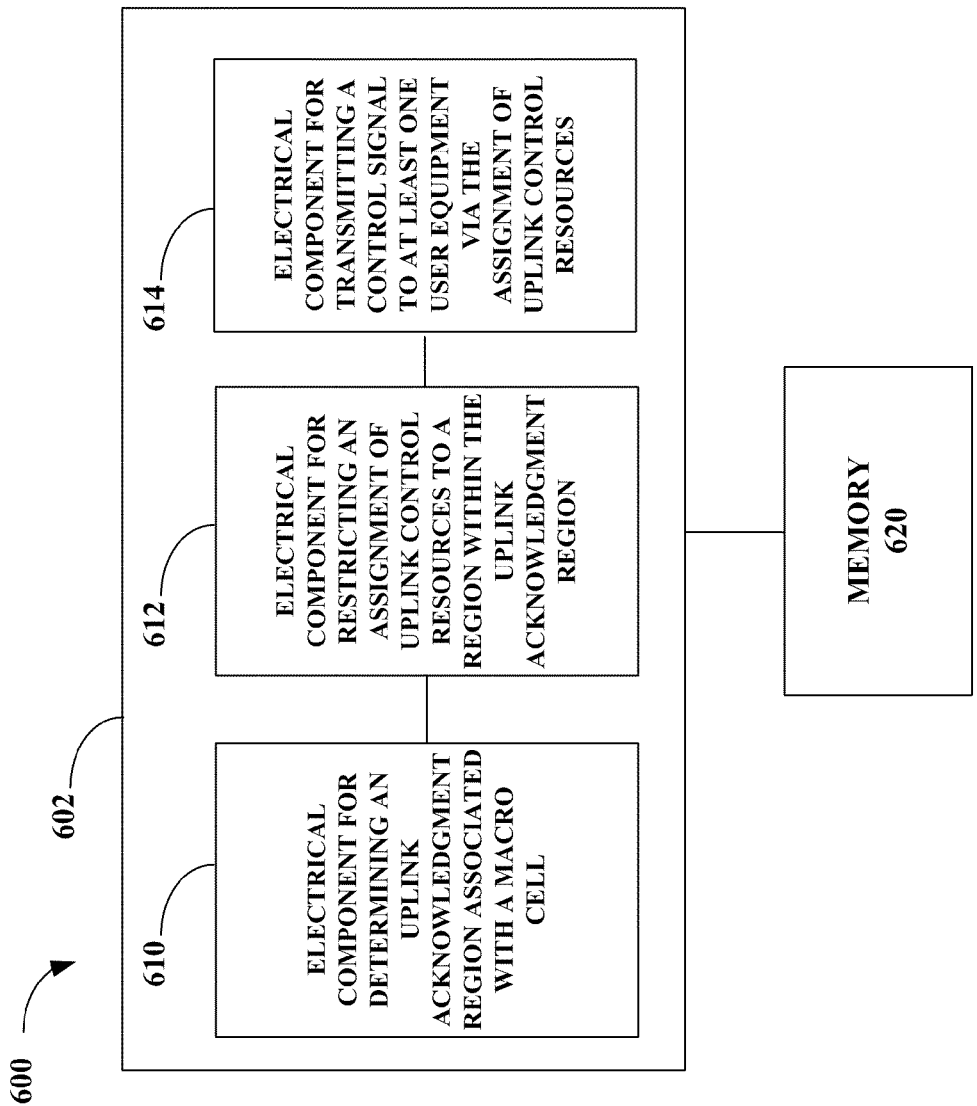
FIG. 6 is an illustration of a first exemplary coupling of electrical components that effectuate reducing interference according to an embodiment.

Turning to FIG. 6, illustrated is a system 600 that facilitates multiplexing control signals in heterogeneous networks according to an embodiment. System 600 and/or instructions for implementing system 600 can reside within an access point base station (e.g., heterogeneous entity 500). As depicted, system 600 includes functional blocks that can represent functions implemented by a processor using instructions and/or data from a computer readable storage medium. System 600 includes a logical grouping 602 of electrical components that can act in conjunction. As illustrated, logical grouping 602 can include an electrical component for determining an uplink acknowledgment region associated with a macro cell 610. Furthermore, logical grouping 602 can include an electrical component for restricting an assignment of uplink control resources to a region within the uplink acknowledgment region 612. Logical grouping 602 can also include an electrical component for transmitting a control signal to at least one user equipment via the assignment of uplink control resources 614. Additionally, system 600 can include a memory 620 that retains instructions for executing functions associated with electrical components 610, 612, and 614. While shown as being external to memory 620, it is to be understood that electrical components 610, 612, and 614 can exist within memory 620.

Figure 7:
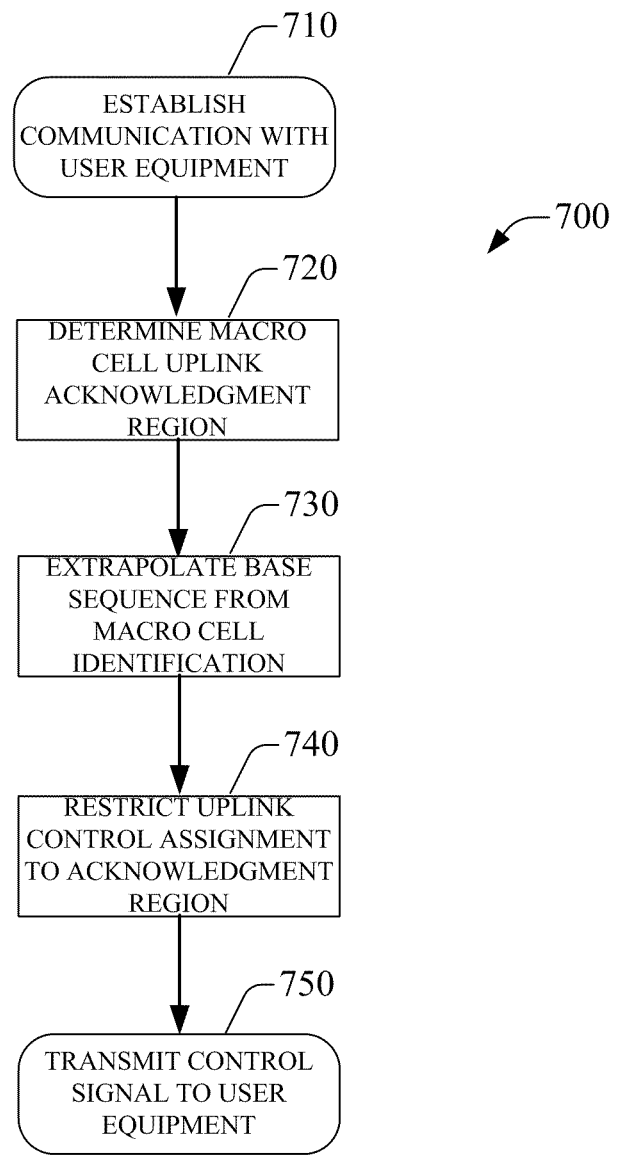
FIG. 7 is a first flow diagram of a first exemplary methodology for reducing interference in accordance with an aspect of the subject specification.

Referring next to FIG. 7, a flow chart illustrating an exemplary method for facilitating an interference reduction is provided. As illustrated, process 700 includes a series of acts that may be performed within a wireless terminal or network entity according to an aspect of the subject specification. For instance, process 700 may be implemented by employing a processor to execute computer executable instructions stored on a computer readable storage medium to implement the series of acts. In another embodiment, a computer-readable storage medium comprising code for causing at least one computer to implement the acts of process 700 are contemplated.

In an aspect, process 700 begins with a communication with user equipment being established at act 710. At act 720, process 700 continues with the ascertaining of an uplink acknowledgment region associated with an interfering macro cell. In a particular embodiment, an identifier associated with the macro cell is obtained, wherein a base sequence is extrapolated from the macro cell identification at act 730.

Next, at act 740, an uplink control assignment for the user equipment is restricted. Moreover, the uplink control assignment is restricted to within the uplink acknowledgment region of the interfering macro cell, wherein the restricting is based on the extrapolated base sequence. Process 700 then concludes at act 750 with a control signal being transmitted to the user equipment via the assignment of uplink control resources.

Figure 8:
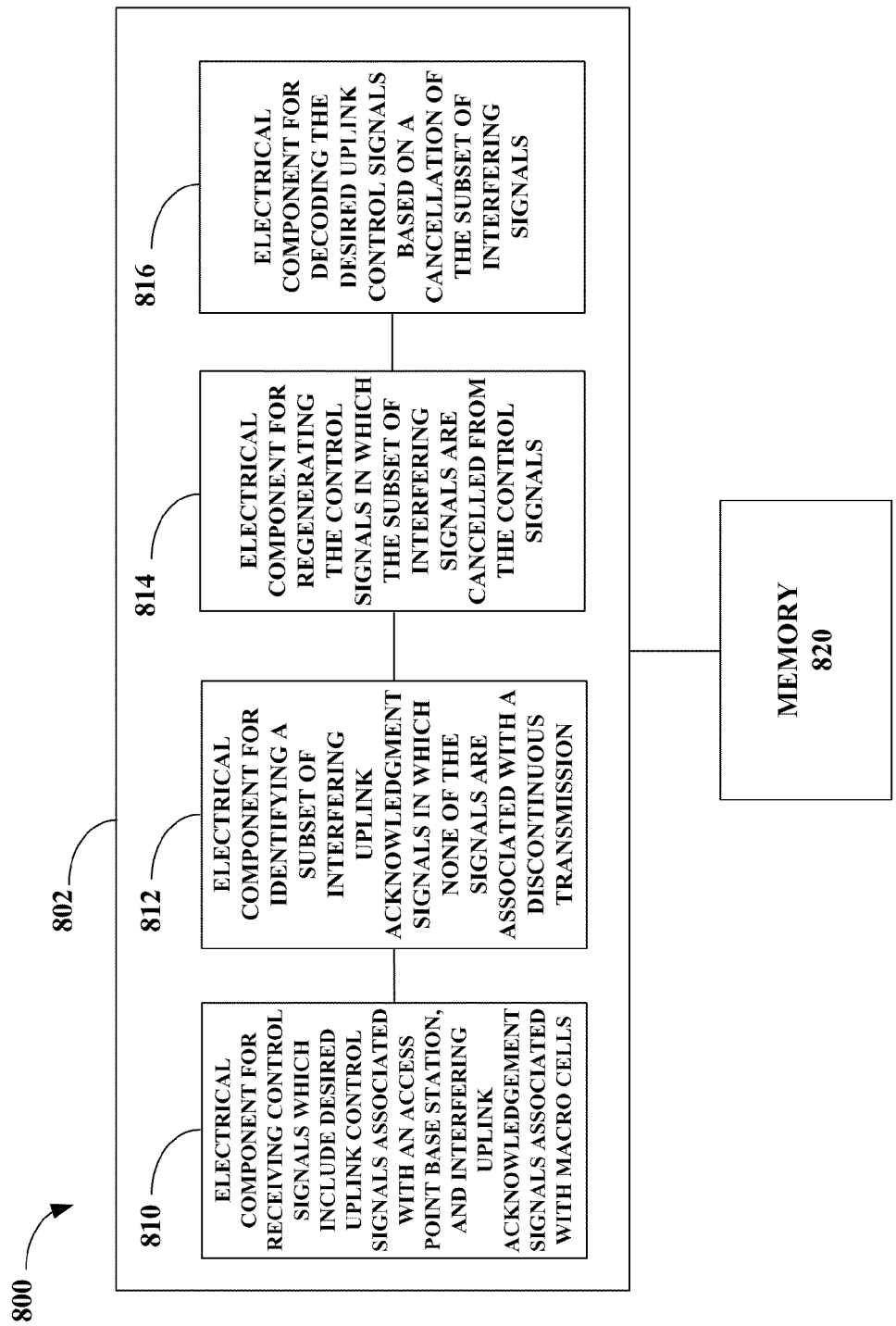
FIG. 8 is an illustration of a second exemplary coupling of electrical components that effectuate reducing interference according to an embodiment.

Referring next to FIG. 8, illustrated is an exemplary system 800 that facilitates a DTX-assisted interference reduction according to an embodiment. System 800 and/or instructions for implementing system 800 can physically reside within an access point base station (e.g., heterogeneous entity 500), for instance, wherein system 800 includes functional blocks that can represent functions implemented by a processor using instructions and/or data from a computer readable storage medium. System 800 includes a logical grouping 802 of electrical components that can act in conjunction similar to logical grouping 602 in system 600. As illustrated, logical grouping 802 can include an electrical component for receiving control signals which include desired uplink control signals associated with an access point base station and interfering uplink acknowledgement signals associated with macro cells 810, as well as an electrical component for identifying a subset of interfering uplink acknowledgment signals in which none of the signals are associated with a discontinuous transmission 812. Logical grouping 802 can also include an electrical component for regenerating the control signals in which the subset of interfering signals are cancelled from the control signals 814. Further, logical grouping 802 can include an electrical component for decoding the desired uplink control signals based on a cancellation of the subset of interfering signals 816. Additionally, system 800 can include a memory 820 that retains instructions for executing functions associated with electrical components 810, 812, 814, and 816. While shown as being external to memory 820, it is to be understood that electrical components 810, 812, 814, and 816 can exist within memory 820.

Figure 9:
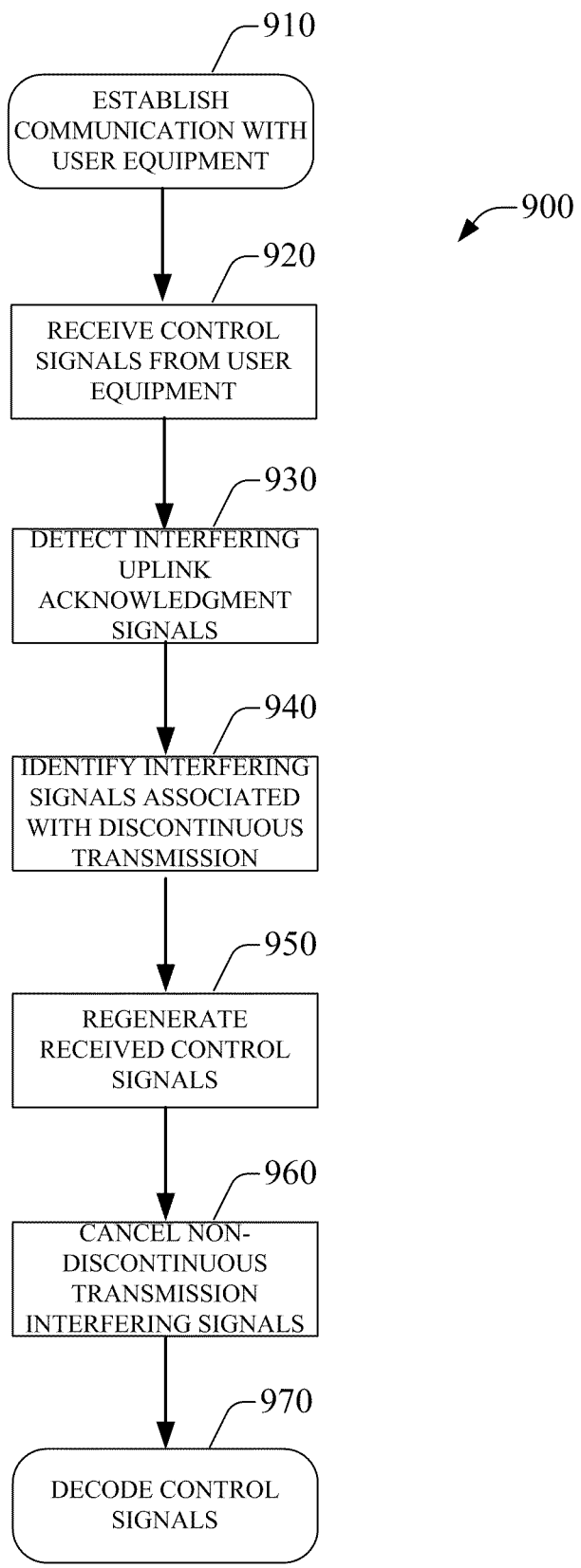
FIG. 9 is a flow diagram of a second exemplary methodology for reducing interference in accordance with an aspect of the subject specification.

Referring next to FIG. 9, a flow chart illustrating an exemplary method for facilitating a DTX-assisted interference reduction is provided. As illustrated, process 900 includes a series of acts that may be performed within a wireless terminal or network entity according to an aspect of the subject specification. For instance, process 900 may be implemented by employing a processor to execute computer executable instructions stored on a computer readable storage medium to implement the series of acts. In another embodiment, a computer-readable storage medium comprising code for causing at least one computer to implement the acts of process 900 are contemplated.

In an aspect, process 900 begins with a communication with user equipment being established at act 910. At act 920, process 900 continues with control signals being received from user equipment. Interfering uplink acknowledgment signals associated with a macro cell are then detected at act 930. Once the interfering acknowledgment signals are detected, process 900 proceeds by identifying which of the interfering signals are associated with a discontinuous transmission at act 940.

In an aspect, determining which of the interfering signals are associated with a discontinuous transmission facilitates a strategic interference cancellation mechanism. Specifically, at act 950, the received control signals are regenerated, wherein any interfering signals not associated with a discontinuous transmission are cancelled at act 960. Process 900 then concludes with the desired control signals being decoded at act 970.

Exemplary Communication System

Figure 10:
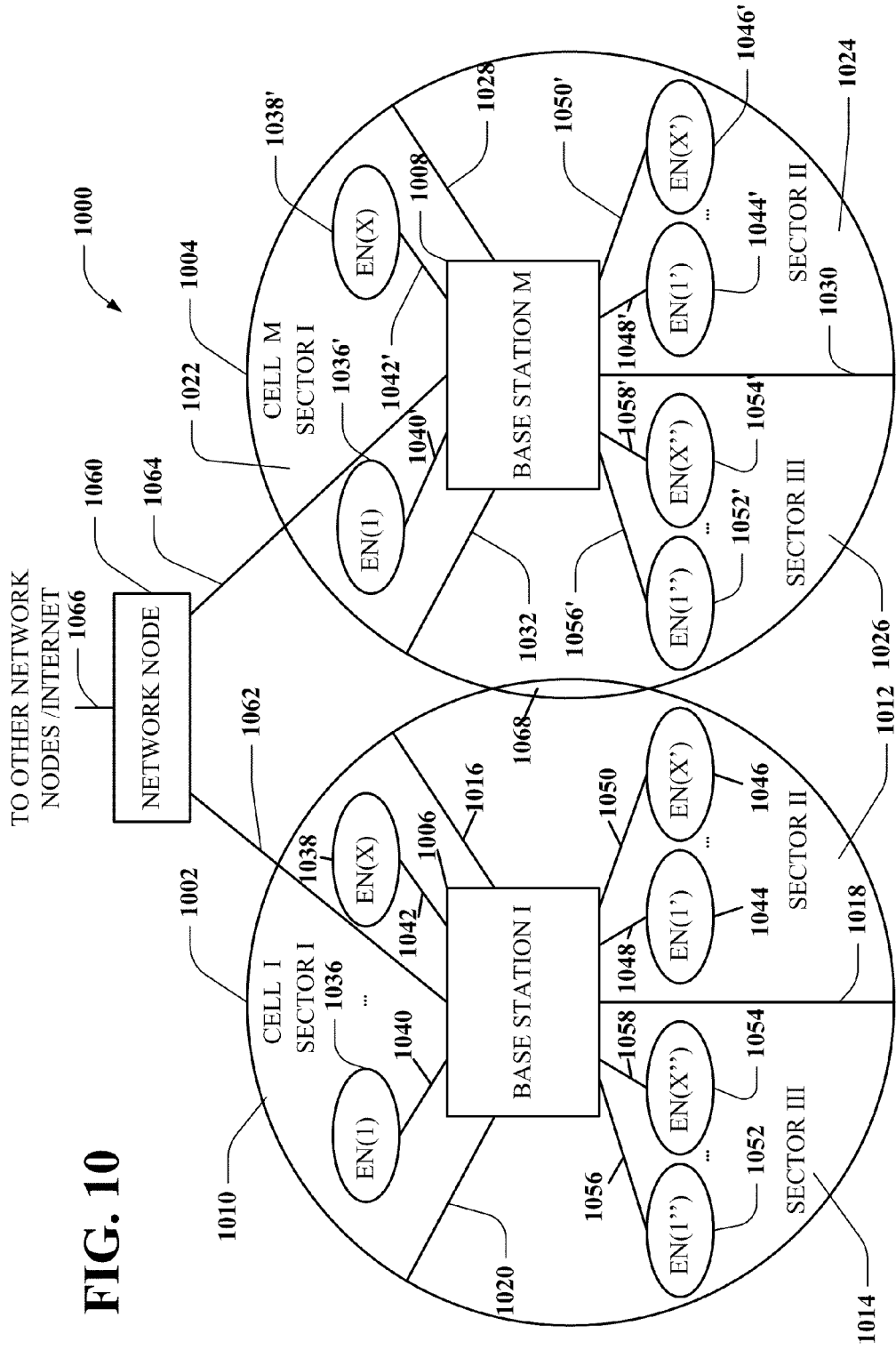
FIG. 10 is an illustration of an exemplary communication system implemented in accordance with various aspects including multiple cells.

Referring next to FIG. 10, an exemplary communication system 1000 having multiple cells (e.g., cell 1002, cell 1004) is illustrated. Here, it should be noted that neighboring cells 1002, 1004 overlap slightly, as indicated by cell boundary region 1068, thereby creating potential for signal interference between signals transmitted by base stations in neighboring cells. Each cell 1002, 1004 of system 1000 includes three sectors. Cells which have not been subdivided into multiple sectors (N=1), cells with two sectors (N=2) and cells with more than 3 sectors (N>3) can also be utilized. Cell 1002 includes a first sector, sector 11010, a second sector, sector II 1012, and a third sector, sector III 1014. Each sector 1010, 1012, and 1014 has two sector boundary regions; each boundary region is shared between two adjacent sectors.

Interference between signals transmitted by base stations in neighboring sectors can occur in boundary regions. Line 1016 represents a sector boundary region between sector 11010 and sector II 1012; line 1018 represents a sector boundary region between sector II 1012 and sector III 1014; line 1020 represents a sector boundary region between sector III 1014 and sector 11010. Similarly, cell M 1004 includes a first sector, sector 11022, a second sector, sector II 1024, and a third sector, sector III 1026. Line 1028 represents a sector boundary region between sector 11022 and sector II 1024; line 1030 represents a sector boundary region between sector II 1024 and sector III 1026; line 1032 represents a boundary region between sector III 1026 and sector 11022. Cell 11002 includes a base station (BS), base station 11006, and a plurality of end nodes (ENs) in each sector 1010, 1012, 1014. Sector 11010 includes EN(1) 1036 and EN(X) 1038 coupled to BS 1006 via wireless links 1040, 1042, respectively; sector II 1012 includes EN(1') 1044 and EN(X') 1046 coupled to BS 1006 via wireless links 1048, 1050, respectively; sector III 1014 includes EN(1") 1052 and EN(X") 1054 coupled to BS 1006 via wireless links 1056, 1058, respectively. Similarly, cell M 1004 includes base station M 1008, and a plurality of end nodes (ENs) in each sector 1022, 1024, and 1026. Sector 11022 includes EN(1) 1036' and EN(X) 1038' coupled to BS M 1008 via wireless links 1040', 1042', respectively; sector II 1024 includes EN(1') 1044' and EN(X') 1046' coupled to BS M 1008 via wireless links 1048', 1050', respectively; sector III 1026 includes EN(1") 1052' and EN(X") 1054' coupled to BS 1008 via wireless links 1056', 1058', respectively.

System 1000 also includes a network node 1060 which is coupled to BS I 1006 and BS M 1008 via network links 1062, 1064, respectively. Network node 1060 is also coupled to other network nodes, e.g., other base stations, AAA server nodes, intermediate nodes, routers, etc. and the Internet via network link 1066. Network links 1062, 1064, 1066 may be, e.g., fiber optic cables. Each end node, e.g. EN 1 1036 may be a wireless terminal including a transmitter as well as a receiver. The wireless terminals, e.g., EN(1) 1036 may move through system 1000 and may communicate via wireless links with the base station in the cell in which the EN is currently located. The wireless terminals, (WTs), e.g. EN(1) 1036, may communicate with peer nodes, e.g., other WTs in system 1000 or outside system 1000 via a base station, e.g. BS 1006, and/or network node 1060. WTs, e.g., EN(1) 1036 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 11:
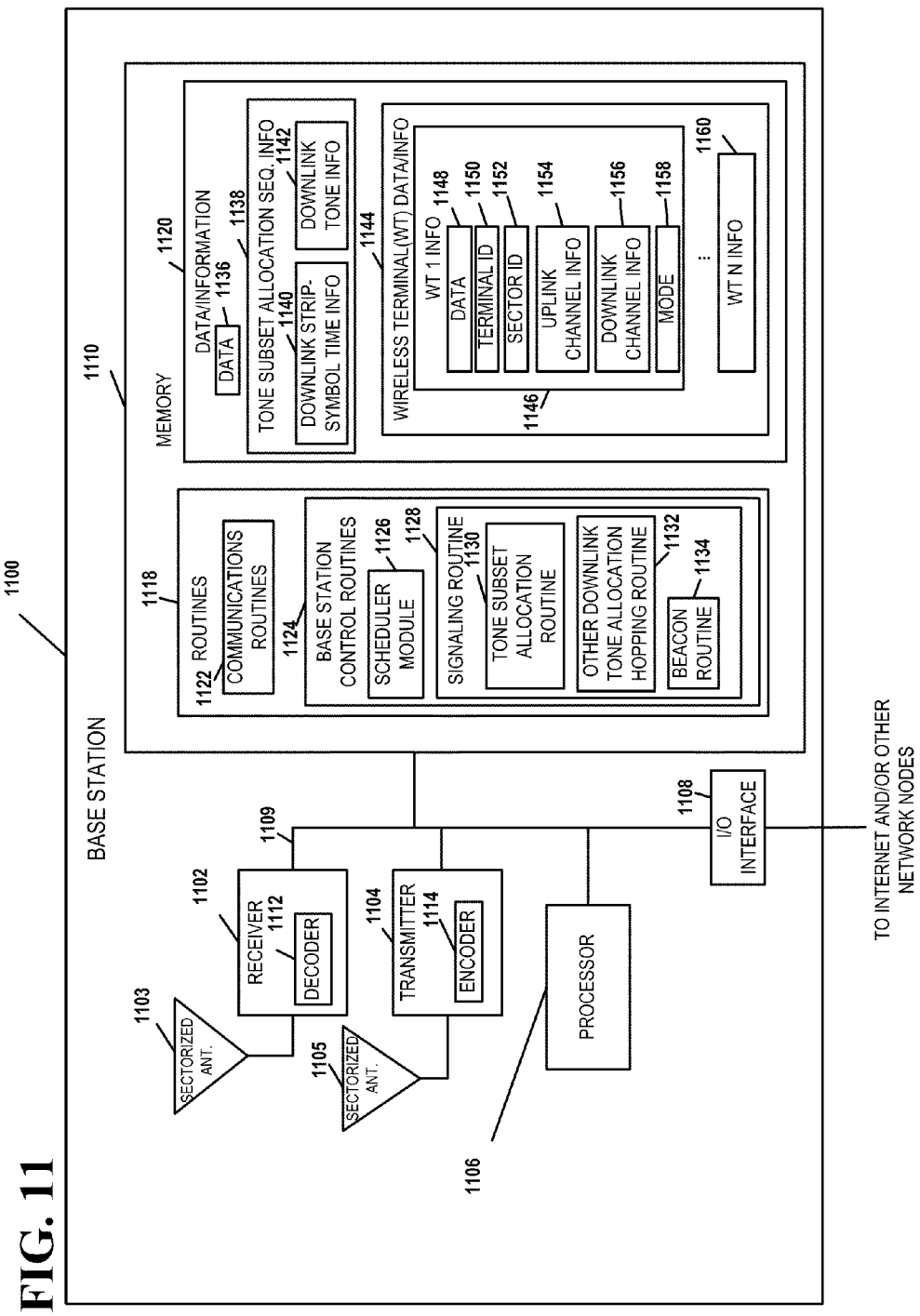
FIG. 11 is an illustration of an exemplary base station in accordance with various aspects described herein.

FIG. 11 illustrates an example base station 1100. Base station 1100 implements tone subset allocation sequences, with different tone subset allocation sequences generated for respective different sector types of the cell. Base station 1100 may be used as any one of base stations 1006, 1008 of the system 1000 of FIG. 10. The base station 1100 includes a receiver 1102, a transmitter 1104, a processor 1106, e.g., CPU, an input/output interface 1108 and memory 1110 coupled together by a bus 1109 over which various elements 1102, 1104, 1106, 1108, and 1110 may interchange data and information.

Sectorized antenna 1103 coupled to receiver 1102 is used for receiving data and other signals, e.g., channel reports, from wireless terminals transmissions from each sector within the base station's cell. Sectorized antenna 1105 coupled to transmitter 1104 is used for transmitting data and other signals, e.g., control signals, pilot signal, beacon signals, etc. to wireless terminals 1200 (see FIG. 12) within each sector of the base station's cell. In various aspects, base station 1100 may employ multiple receivers 1102 and multiple transmitters 1104, e.g., an individual receivers 1102 for each sector and an individual transmitter 1104 for each sector. Processor 1106, may be, e.g., a general purpose central processing unit (CPU). Processor 1106 controls operation of base station 1100 under direction of one or more routines 1118 stored in memory 1110 and implements the methods. I/O interface 1108 provides a connection to other network nodes, coupling the BS 1100 to other base stations, access routers, AAA server nodes, etc., other networks, and the Internet. Memory 1110 includes routines 1118 and data/information 1120.

Data/information 1120 includes data 1136, tone subset allocation sequence information 1138 including downlink strip-symbol time information 1140 and downlink tone information 1142, and wireless terminal (WT) data/info 1144 including a plurality of sets of WT information: WT 1 info 1146 and WT N info 1160. Each set of WT info, e.g., WT 1 info 1146 includes data 1148, terminal ID 1150, sector ID 1152, uplink channel information 1154, downlink channel information 1156, and mode information 1158.

Routines 1118 include communications routines 1122 and base station control routines 1124. Base station control routines 1124 includes a scheduler module 1126 and signaling routines 1128 including a tone subset allocation routine 1130 for strip-symbol periods, other downlink tone allocation hopping routine 1132 for the rest of symbol periods, e.g., non strip-symbol periods, and a beacon routine 1134.

Data 1136 includes data to be transmitted that will be sent to encoder 1114 of transmitter 1104 for encoding prior to transmission to WTs, and received data from WTs that has been processed through decoder 1112 of receiver 1102 following reception. Downlink strip-symbol time information 1140 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1142 includes information including a carrier frequency assigned to the base station 1100, the number and frequency of tones, and the set of tone subsets to be allocated to the strip-symbol periods, and other cell and sector specific values such as slope, slope index and sector type.

Data 1148 may include data that WT1 1200 has received from a peer node, data that WT 1 1200 desires to be transmitted to a peer node, and downlink channel quality report feedback information. Terminal ID 1150 is a base station 1100 assigned ID that identifies WT 1 1200. Sector ID 1152 includes information identifying the sector in which WT1 1200 is operating. Sector ID 1152 can be used, for example, to determine the sector type. Uplink channel information 1154 includes information identifying channel segments that have been allocated by scheduler 1126 for WT1 1200 to use, e.g., uplink traffic channel segments for data, dedicated uplink control channels for requests, power control, timing control, etc. Each uplink channel assigned to WT 1 1200 includes one or more logical tones, each logical tone following an uplink hopping sequence. Downlink channel information 1156 includes information identifying channel segments that have been allocated by scheduler 1126 to carry data and/or information to WT1 1200, e.g., downlink traffic channel segments for user data. Each downlink channel assigned to WT1 1200 includes one or more logical tones, each following a downlink hopping sequence. Mode information 1158 includes information identifying the state of operation of WT1 1200, e.g. sleep, hold, on.

Communications routines 1122 are utilized by base station 1100 to perform various communications operations and implement various communications protocols. Base station control routines 1124 are used to control the base station 1100 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1128 controls the operation of receiver 1102 with its decoder 1112 and transmitter 1104 with its encoder 1114. The signaling routine 1128 is responsible controlling the generation of transmitted data 1136 and control information. Tone subset allocation routine 1130 constructs the tone subset to be used in a strip-symbol period using the method of the aspect and using data/info 1120 including downlink strip-symbol time info 1140 and sector ID 1152. The downlink tone subset allocation sequences will be different for each sector type in a cell and different for adjacent cells. The WTs 1200 receive the signals in the strip-symbol periods in accordance with the downlink tone subset allocation sequences; the base station 1100 uses the same downlink tone subset allocation sequences in order to generate the transmitted signals. Other downlink tone allocation hopping routine 1132 constructs downlink tone hopping sequences, using information including downlink tone information 1142, and downlink channel information 1156, for the symbol periods other than the strip-symbol periods. The downlink data tone hopping sequences are synchronized across the sectors of a cell. Beacon routine 1134 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 12:
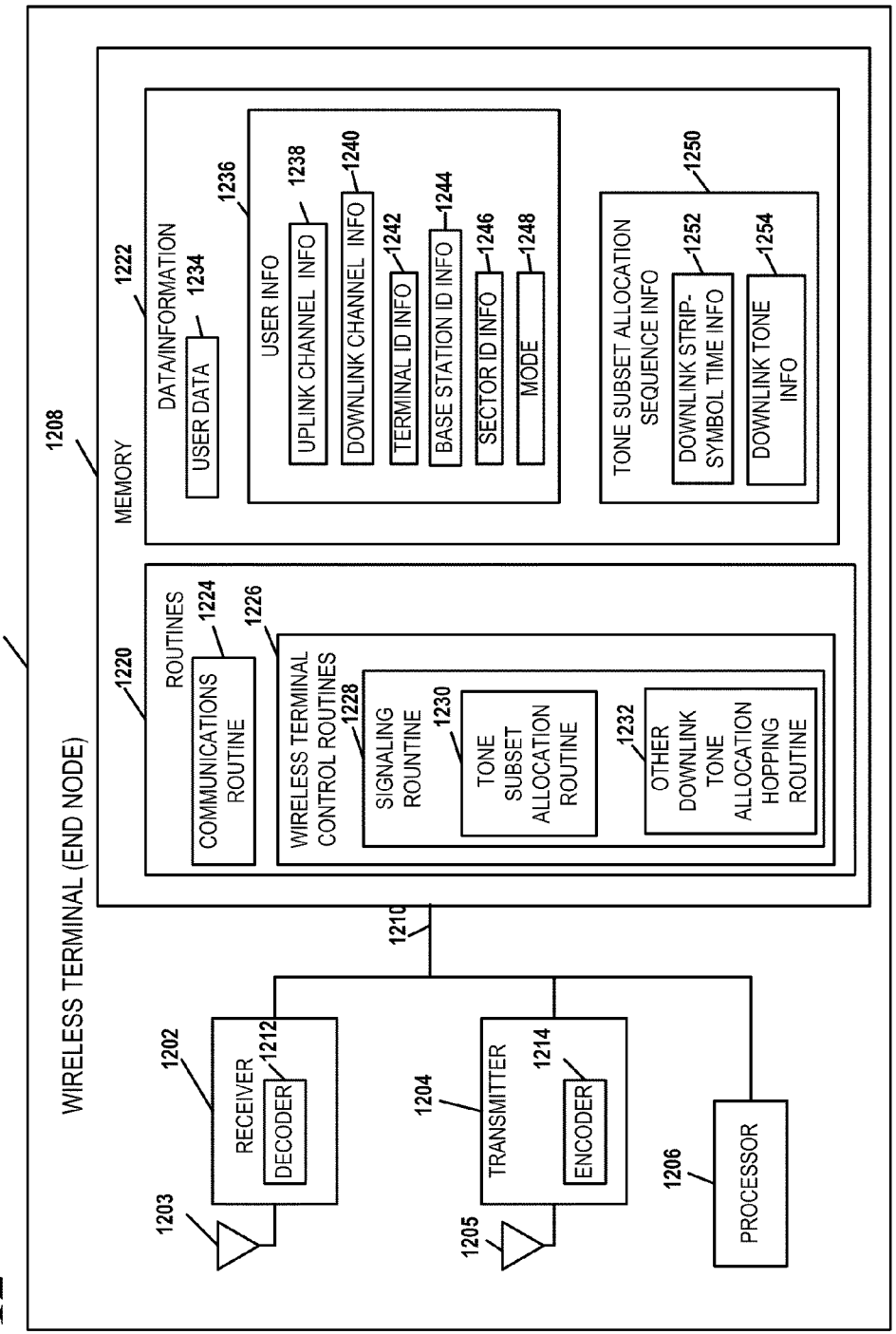
FIG. 12 is an illustration of an exemplary wireless terminal implemented in accordance with various aspects described herein.

FIG. 12 illustrates an example wireless terminal (end node) 1200 which can be used as any one of the wireless terminals (end nodes), e.g., EN(1) 1036, of the system 1000 shown in FIG. 10. Wireless terminal 1200 implements the tone subset allocation sequences. The wireless terminal 1200 includes a receiver 1202 including a decoder 1212, a transmitter 1204 including an encoder 1214, a processor 1206, and memory 1208 which are coupled together by a bus 1210 over which the various elements 1202, 1204, 1206, 1208 can interchange data and information. An antenna 1203 used for receiving signals from a base station (and/or a disparate wireless terminal) is coupled to receiver 1202. An antenna 1205 used for transmitting signals, e.g., to a base station (and/or a disparate wireless terminal) is coupled to transmitter 1204.

The processor 1206, e.g., a CPU controls the operation of the wireless terminal 1200 and implements methods by executing routines 1220 and using data/information 1222 in memory 1208.

Data/information 1222 includes user data 1234, user information 1236, and tone subset allocation sequence information 1250. User data 1234 may include data, intended for a peer node, which will be routed to encoder 1214 for encoding prior to transmission by transmitter 1204 to a base station, and data received from the base station which has been processed by the decoder 1212 in receiver 1202. User information 1236 includes uplink channel information 1238, downlink channel information 1240, terminal ID information 1242, base station ID information 1244, sector ID information 1246, and mode information 1248. Uplink channel information 1238 includes information identifying uplink channels segments that have been assigned by a base station for wireless terminal 1200 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1240 includes information identifying downlink channel segments that have been assigned by a base station to WT 1200 for use when the base station is transmitting data/information to WT 1200. Downlink channels may include downlink traffic channels and assignment channels, each downlink channel including one or more logical tone, each logical tone following a downlink hopping sequence, which is synchronized between each sector of the cell.

User info 1236 also includes terminal ID information 1242, which is a base station-assigned identification, base station ID information 1244 which identifies the specific base station that WT has established communications with, and sector ID info 1246 which identifies the specific sector of the cell where WT 1200 is presently located. Base station ID 1244 provides a cell slope value and sector ID info 1246 provides a sector index type; the cell slope value and sector index type may be used to derive tone hopping sequences. Mode information 1248 also included in user info 1236 identifies whether the WT 1200 is in sleep mode, hold mode, or on mode.

Tone subset allocation sequence information 1250 includes downlink strip-symbol time information 1252 and downlink tone information 1254. Downlink strip-symbol time information 1252 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1254 includes information including a carrier frequency assigned to the base station, the number and frequency of tones, and the set of tone subsets to be allocated to the strip-symbol periods, and other cell and sector specific values such as slope, slope index and sector type.

Routines 1220 include communications routines 1224 and wireless terminal control routines 1226. Communications routines 1224 control the various communications protocols used by WT 1200. Wireless terminal control routines 1226 controls basic wireless terminal 1200 functionality including the control of the receiver 1202 and transmitter 1204. Wireless terminal control routines 1226 include the signaling routine 1228. The signaling routine 1228 includes a tone subset allocation routine 1230 for the strip-symbol periods and an other downlink tone allocation hopping routine 1232 for the rest of symbol periods, e.g., non strip-symbol periods. Tone subset allocation routine 1230 uses user data/info 1222 including downlink channel information 1240, base station ID info 1244, e.g., slope index and sector type, and downlink tone information 1254 in order to generate the downlink tone subset allocation sequences in accordance with some aspects and process received data transmitted from the base station. Other downlink tone allocation hopping routine 1232 constructs downlink tone hopping sequences, using information including downlink tone information 1254, and downlink channel information 1240, for the symbol periods other than the strip-symbol periods. Tone subset allocation routine 1230, when executed by processor 1206, is used to determine when and on which tones the wireless terminal 1200 is to receive one or more strip-symbol signals from the base station 1100. The uplink tone allocation hopping routine 1232 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates multiplexing control signals in heterogeneous networks, the method comprising:
    determining an uplink acknowledgment region associated with an interfering macro cell;
    determining uplink control resources available for assignment by an access point base station to at least one UE, the uplink control resources being restricted to a control region within the uplink acknowledgment region of the interfering macro cell, thereby ensuring that uplink acknowledgement (ACK) and Channel Quality Indicator (CQI) resource assignments to the at least one UE only collide with the uplink acknowledgement region of the interfering macro cell; and
    transmitting, by the access point, a control signal to the at least one user equipment, the control signal being transmitted via assignment of the uplink control resources to the at least one UE.

2. The method of claim 1, further comprising extrapolating a base sequence from an identifier associated with the interfering macro cell, and the restricting is performed according to the base sequence.

3. The method of claim 1, wherein the assigned uplink control resources include a set of Channel Quality Indicator resources associated with the access point base station.

4. The method of claim 1, wherein the assignment of uplink control resources includes a set of acknowledgment resources associated with the access point base station.

5. The method of claim 1, further comprising ascertaining a second uplink acknowledgment region associated with the access point base station, and wherein the control region is within the second uplink acknowledgment region.

6. The method of claim 1, wherein the access point base station is associated with a femto cell.

7. The method of claim 1, wherein the access point base station is associated with a pico cell.

8. An apparatus configured to facilitate multiplexing control signals in heterogeneous networks, comprising:
    a processor configured to execute computer executable components stored in memory, the components including:
        a macro uplink component configured to determine an uplink acknowledgment region associated with an interfering macro cell;
        an assignment component configured to determine uplink control resources available for assignment by an access point base station to at least one UE, the uplink control resources being restricted to a control region within the uplink acknowledgment region of the interfering macro cell, thereby ensuring that uplink acknowledgement (ACK) and Channel Quality Indicator (CQI) resource assignments to the at least one UE only collide with the uplink acknowledgement region of the interfering macro cell; and
        a transmitting component configured to transmit, by the access point, a control signal to the at least one user equipment via assignment of the uplink control resources to the at least one UE.

9. The apparatus of claim 8, wherein the macro uplink component is configured to extrapolate a base sequence from an identifier associated with the interfering macro cell, and wherein the assignment component is configured to restrict the assignment of uplink control resources according to the base sequence.

10. The apparatus of claim 8, wherein the assignment of uplink control resources includes a set of Channel Quality Indicator resources associated with the access point base station.

11. The apparatus of claim 8, wherein the assignment of uplink control resources includes a set of acknowledgment resources associated with the access point base station.

12. The apparatus of claim 8, wherein the macro uplink component is configured to ascertain a second uplink acknowledgment region associated with the access point base station, and wherein the control region is within the second uplink acknowledgment region.

13. The apparatus of claim 8, wherein the access point base station is associated with a femto cell.

14. The apparatus of claim 8, wherein the access point base station is associated with a pico cell.

15. A computer program product that facilitates multiplexing control signals in heterogeneous networks, stored on a non-transitory computer-readable storage medium, comprising code for causing at least one computer to:
    determine an uplink acknowledgment region, wherein the uplink acknowledgment region is associated with an interfering macro cell;
    determine uplink control resources available for assignment by an access point base station to at least one UE, the uplink control resources being restricted to a control region within the uplink acknowledgment region of the interfering macro cell, thereby ensuring that uplink acknowledgement (ACK) and Channel Quality Indicator (CQI) resource assignments to the at least one UE only collide with the uplink acknowledgement region of the interfering macro cell; and
    transmit, by the access point, a control signal to the at least one user equipment, the control signal being transmitted via assignment of the uplink control resources to the at least one UE.

16. The computer program product of claim 15, wherein the code causes the at least one computer to extrapolate a base sequence from an identifier associated with the interfering macro cell, and wherein the code further restricts the assignment of uplink control resources according to the base sequence.

17. The computer program product of claim 15, wherein the assignment of uplink control resources includes a set of Channel Quality Indicator resources associated with the access point base station.

18. The computer program product of claim 15, wherein the assignment of uplink control resources includes a set of acknowledgment resources associated with the access point base station.

19. The computer program product of claim 15, wherein the code causes the at least one computer to ascertain a second uplink acknowledgment region associated with the access point base station, and wherein the control region is within the second uplink acknowledgment region.

20. The computer program product of claim 15, wherein the access point base station is associated with a femto cell.

21. The computer program product of claim 15, wherein the access point base station is associated with a pico cell.

22. An apparatus configured to facilitate multiplexing control signals in heterogeneous networks, the apparatus comprising:
means for determining an uplink acknowledgment region, wherein the uplink acknowledgment region is associated with a an interfering macro cell;
means for determining uplink control resources available for assignment by an access point base station to at least one UE, the uplink control resources being restricted to a control region within the uplink acknowledgment region of the interfering macro cell, thereby ensuring that uplink acknowledgement (ACK) and Channel Quality Indicator (CQI) resource assignments to the at least one UE only collide with the uplink acknowledgement region of the interfering macro cell; and
means for transmitting, by the access point, a control signal to the at least one user equipment, the control signal being transmitted via assignment of the uplink control resources to the at least one UE.

23. The apparatus of claim 22, wherein the means for determining is configured to extrapolate a base sequence from an identifier associated with the interfering macro cell, and wherein the means for assigning restricts assignment of the uplink control resources according to the base sequence.

24. The apparatus of claim 22, wherein the assignment of uplink control resources includes a set of Channel Quality Indicator resources associated with the access point base station.

25. The apparatus of claim 22, wherein the assignment of uplink control resources includes a set of acknowledgment resources associated with the access point base station.

26. The apparatus of claim 22, wherein the means for determining is configured to ascertain a second uplink acknowledgment region associated with the access point base station, and wherein the control region is within the second uplink acknowledgment region.

27. The apparatus of claim 22, wherein the access point base station is associated with a femto cell.

28. The apparatus of claim 22, wherein the access point base station is associated with a pico cell.

* * * * *